United States Patent [19]

Birchall et al.

[11] 4,015,050

[45] * Mar. 29, 1977

[54] PLASTICS FILM WITH AN ALUMINIUM PHOSPHATE COATING

[75] Inventors: James Derek Birchall, Norley; John Edward Cassidy, Hartford, both of England

[73] Assignee: Imperial Chemical Industries Limited, London, England

[ * ] Notice: The portion of the term of this patent subsequent to Mar. 11, 1992, has been disclaimed.

[22] Filed: Dec. 10, 1971

[21] Appl. No.: 206,910

Related U.S. Application Data

[63] Continuation-in-part of Ser. No. 42,499, June 1, 1970.

[30] Foreign Application Priority Data

Dec. 11, 1970 United Kingdom ............ 59021/70

[52] U.S. Cl. .............................. 428/480; 427/365; 427/372 R; 427/427; 427/430 R; 428/474; 428/500; 428/521; 428/522; 428/523; 428/532; 428/539

[51] Int. Cl.² .................. B32B 27/06; B32B 27/36

[58] Field of Search ........ 117/138.8 F, 138, 160 R, 117/169; 260/448 R; 428/474, 480, 500, 521, 522, 523, 532, 539; 427/365, 372 R, 427, 430 R

[56] References Cited

UNITED STATES PATENTS

| 2,685,539 | 8/1954 | Woodburn et al. | 117/169 |
|---|---|---|---|
| 2,685,542 | 8/1954 | Woodburn et al. | 117/169 |
| 2,786,787 | 3/1957 | Florio | 117/169 |
| 2,909,451 | 10/1959 | Lawler et al. | 117/169 |
| 3,788,885 | 1/1974 | Birchall et al. | 117/169 |
| 3,870,737 | 3/1975 | Birchall et al. | 260/448 |

FOREIGN PATENTS OR APPLICATIONS 2,051,101 3/1971 France

*Primary Examiner*—Ronald H. Smith
*Assistant Examiner*—Sadie L. Childs
*Attorney, Agent, or Firm*—Cushman, Darby & Cushman

[57] ABSTRACT

An organic, plastics film having a coating on at least one surface of said film of an aluminium phosphate, the aluminium phosphate being produced from halogen-containing complex aluminium phosphates.

7 Claims, No Drawings

PLASTICS FILM WITH AN ALUMINIUM PHOSPHATE COATING

This application is a continuation-in-part of application Ser. No. 42,499, filed June 1, 1970.

This invention relates to organic, plastics films, in particular to organic, plastics films having a coating of aluminium phosphate and a process for the production of such coated films.

For many applications of plastics films it is desirable to improve the inherent characteristics of the films. It has now been found that improvements in several properties may be obtained by coating the surface of the films with aluminium phosphate. In this way it has been found possible to obtain improved products by, for example, improving abrasion resistance, decreasing the permeability to gases, altering other characteristics, such as the photosensitivity, slip properties, stiffness and the like, and by making the surfaces more antistatic.

Accordingly, the present invention provides an organic, plastics film having a coating on at least one surface of said film of aluminium phosphate derived from a halogen-containing complex phosphate of aluminium containing at least one chemically bound molecule of a hydroxy compound R-OH wherein R is a hydrogen atom or an organic group.

There is further provided a process for providing an organic, plastics film with a coating of aluminium phosphate comprising coating at least one surface of the film with a coating composition as hereinbefore described and drying the coating by heating to a temperature of at least 80° C to give an adherent coating of aluminium phosphate.

Within the term "film" we include unitary films, i.e. films fabricated from a single component, laminated films formed by bonding together a plurality of film layers of the same or different chemical composition, and foamed films produced by incorporation of a suitable blowing agent into the film-forming melt. The thickness of a film is conveniently expressed in terms of gauge, where 100 gauge indicates a thickness of 0.0254 mm. The preferred films for use in the present invention vary in thickness from about 25 to about 1500 gauge.

Suitable film forming materials include cellulose and preferably synthetic organic thermoplastics such as polyolefins, for example polymers and copolymers of ethylene, propylene, butadiene, isoprene, 4-methyl pentene-1 and styrene, copolymers of ethylene with unsaturated esters such as vinyl acetate or alkyl acrylates or methacrylates, modified polystyrene, for example a styrene-maleic anhydride copolymer, polymers and copolymers of other ethylenically unsaturated monomers such as vinyl chloride, vinylidene chloride, chloroprene, acrylonitrile, methacrylonitrile, methyl methacrylate, ethyl acrylate and vinyl acetate, polyphenylene oxides and sulphides, polysulphones, polyoxymethylenes, polyamides such as polycaprolactam (Nylon 6), polyhexamethylene adipamide (Nylon 6–6) and polyundecanolactam (Nylon 11), and polycarbonates and polyesters such as polyethylene 1,2-diphenoxyethane-4, 4'-dicarboxylate and polyethylene terephthalate.

Films for use in the process of the present invention are employed in either an undrawn state, i.e. in the as cast condition, for example films of polyvinyl chloride or polystyrene, or in a drawn condition in which the tensile properties of the film are improved, first by stretching the film at a temperature above the second order transistion point of the polymeric film either uniaxially or biaxially in two mutually perpendicular directions in the plane of the film to orient the molecular structure of the film, and then heat setting the film at a temperature below its melting point while the film is held under tension. Typical examples of drawn film are polypropylene and polyethylene terephthalate films.

The aluminium phosphate is suitably derived from a complex aluminium phosphate. Suitable complex aluminium phosphates are halogen-containing complex phosphates of aluminium containing at least one chemically-bound molecule of a hydroxy compound R-OH wherein R is a hydrogen atom or an organic group. The term "phosphate" includes phosphate esters and acid phosphates.

Where R is an organic group, it is preferred that it be an aliphatic hydrocarbon group or a substituted aliphatic hydrocarbon group, for example wherein the substituent is one or more of the following: amino, phenyl, hydroxy, carboxy or alkoxy. Unsubstituted aliphatic alcohols are especially preferred as the hydroxy compound since complex aluminium phosphates according to the invention containing them are easily separated solids obtainable in high yield. We have found that aliphatic alcohols containing one to ten carbon atoms are especially suitable, and owing to their ready availability we prefer to use aliphatic alcohols containing from one to four carbon atoms, for example, methanol, ethanol, propan-1-ol or propan-2-ol. In preferred embodiments of the invention, ethanol is used, as the complex aluminium phosphates containing it are especially readily formed as solids in high yield.

The halogen in the halogen-containing complex phosphate of aluminium is preferably chlorine, but the compounds may contain other halogens, for example bromine or iodine.

The ratio of the number of gram atoms of aluminium to the number of gram atoms of phosphorus in the complex phosphates of aluminium may vary over a wide range, for example from 1:2 to 2:1, but is preferably substantially 1:1 as complex phosphates of the invention having this ratio decompose at low temperatures directly to form aluminium orthophosphate having greater chemical stability and refractoriness than aluminium phosphate formed from complex phosphates with other ratios. The ratio of the number of gram atoms of aluminium to the number of gram atoms of halogen in the complex phosphates is preferably substantially 1:1.

The complex phosphates of the invention may be monomeric or polymeric.

The structure of the complex phosphates is not fully understood and some of the chemically-bound hydroxy compounds may be bound as groups —OR rather than as complete molecules.

The monomeric forms, or the repeating units of the polymeric forms of the complex phosphates, may contain for example from one to five molecules of the hydroxy compound. Most frequently the number of molecules of the hydroxy compound is 4. In some cases the complex phosphates may contain molecules of different hydroxy compounds; for example they may contain both chemically-bound water and a chemically-bound organic hydroxy compound, the total number of such molecules being for example from 2 to 5.

Examples of such complex aluminium phosphates are those having the empirical formulae $AlPClH_{25}C_8O_8$, $AlPClH_{11}O_9$ and $AlPBrH_{25}C_8O_8$. These compounds are designated aluminium chlorophosphate ethanolate, aluminium chlorophosphate hydrate and aluminium bromophosphate ethanolate respectively, but it is to be understood that this designation in no way implies any particular molecular structure for the compound.

The complex aluminium phosphates, containing at least one chemically-bound molecule of an organic hydroxy compound, are generally soluble in water and organic solvents, especially polar organic solvents. Complex aluminium phosphates containing chemically-bound water molecules are soluble in water. Their solubility in solvent mixtures increases as the proportion of polar solvent in the solvent mixture increases. Solvents comprising water and a water-miscible organic solvent are especially convenient for dissolving the complex phosphates. Solubility generally increases as the pH of the solution is decreased, and it is preferable to establish a pH of less than 2.5 in water solutions to maintain maximum solubility. The compounds of the invention generally give viscous solutions in water.

Especially useful organic solvents are aliphatic alcohols containing up to 10 carbon atoms, esters, polyhydric alcohols, and glycol esters. Most preferred are aliphatic alcohols containing from 1 to 5 carbon atoms, for example methanol or ethanol. The solvent may be a mixture of solvents. The ratio of the number of gram atoms of aluminium to the number of gram atoms of phosphorus in the composition may vary over a wide range, for example from 1:2 to 1.5:1, but is preferably substantially 1:1, as aluminium phosphate formed by decomposition of a composition having this ratio is especially stable.

The complex aluminium phosphate or a mixture containing the said complex phosphate, for example in solution, may be prepared for example by reacting aluminium or an aluminium compound, preferably a halide, with a hydroxy compound R-OH and phosphoric acid, a phosphoric acid ester or a compound capable of forming phosphate acid or a phosphoric acid ester. The aluminium halide may be a simple halide or an oxyhalide or an alkoxy aluminium halide, for example ethoxy aluminium chloride. Other suitable aluminium compounds include aluminium alkoxides, for example aluminium ethoxide. When aluminium or an aluminium compound other than a halide is used, the presence of a halogen acid is necessary. Mixtures of hydroxy compounds may be used. Substances capable of forming phosphoric acid or a phosphoric acid ester include phosphorus pentoxide, phosphorus oxyhalides and phosphorus halides. An aqueous solution of phosphoric acid may be used, conveniently an 88% solution in water, although it is preferred to ensure that no more than about 5% by weight of water based on the total weight of reaction mixture is present when a complex phosphate containing an organic hydroxy compound is prepared, thereby avoiding a loss of yield.

The highest yields of product are obtained when the molar ratio of aluminium to phosphorus in the reaction is substantially 1:1.

The reaction may be carried out over a wide range of temperature, but generally we prefer to use a temperature below 60° C and preferably from 0° C to 50° C, to obtain optimum yields.

The coating compositions providing the aluminium phosphate coatings of this invention are applied either to one face or to both faces of the polymeric film and the coatings may be continuous, extending over the entire surface, or discontinuous in so far as a coating is deposited only on selected portions of the film surface.

Application of the complex phosphate coating solution to the film surface is achieved by any of the conventional solution-coating techniques, for example by spraying a solution of the complex phosphate on to the surface of the film or by immersing the film in a bath of the coating solution. Coating of both surfaces of the film is conveniently achieved by reeling a continuous film strip through a bath of the coating solution. Coating of one side of a film is readily achieved by employment of a triple-roll system of the type employed in a lithographic printing process. In the latter coating process film strip is passed through the nip between a pair of contra-rotating cylindrical rolls, viz a coating roll and a backing roll. Coating solution is applied to the coating roll, and thence to a film, by means of a transfer roll which rotates in surface contact with the coating roll and which picks up coating solution from a solution reservoir, for example either by partial immersion of the transfer roll in the reservoir or by means of a multiple-roll train interposed between the reservoir and the transfer roll, or by any other convenient method.

As hereinbefore described, the coatings may be discontinuous, being deposited only on selected portions of the film surface. In the case of coatings applied by a spraying process, discontinuous coating is conveniently achieved by employing a suitable masking technique, whereas for coatings applied by a roller system a discontinuous coating is most conveniently achieved by means of a transfer roll which is suitably profiled to deposit the desired pattern of coating solution on to the coating roll and thence on to the film substrate.

The coating composition deposited on the substrate is dried by heating, which serves both to remove solvent, if present, and to convert the coating composition to a strongly adherent layer of aluminium phosphate on the substrate. Heating of the coating is effected by any convenient means, for example by passage of the coated film through an air oven maintained at the requisite temperature. Alternatively, when the film is incapable of withstanding the curing temperature, the coating is heated by a method which does not heat the film, for example by micro-wave heating. The duration of heating is preferably at least 10 minutes. Although a temperature of at least 80° C is normally sufficient to form a coat of aluminium phosphate, the coating is preferably heated to a temperature in excess of 100° C.

In the process of coating the film it has been found that optimum results are achieved if at least the first coat applied to the film is in the form of a dilute solution, for example a 5% by weight solution of a complex aluminium phosphate in methanol. Dilute solutions appear to have superior wetting properties to those containing, for example 20% by weight of a complex aluminium phosphate in methanol. Once the primary coat has been deposited and dried successive coats may be deposited from concentrated solutions, for example a solution containing 20% by weight of a complex aluminium phosphate in methanol.

The thickness of the aluminium phosphate layer after the heating process is conveniently between about 0.1 to 10 microns and preferably less than 5 microns, but when the coating is required to exhibit transparency we prefer to maintain the thickness of the cured coating below about 2.5 to 3 microns. Coatings of thickness greater than about 3 microns tend to become powdery and opaque.

Organic materials, preferably polymers, may be dissolved in the solutions from which the coatings of this invention are produced to give coatings comprising an organic material and aluminium phosphate. It is advantageous to add a suitable wetting agent, such as a perfluoro surfactant, to the coating solution to assist uniform coating. Other components, for example crystallisation stabilisers, crystallisation suppressors and pigments, may be incorporated in the coating by including them in the coating solution. For example, when the solvent comprises water it is preferred to use a crystallisation stabiliser, such as finely divided silica or alumina, or a nucleation activator or catalyst, for example dibutyl peroxide, or calcium, magnesium or sodium chloride. When the solution of the complex phosphate is non-aqueous, for example when the solvent is ethanol, it is preferred to use a boric acid ester or ether or a silicic acid ester or ether, for example methyl borate, trimethoxy boroxine or ethyl silicate, to suppress the crystallisation of aluminium phosphate.

Although the coatings of this invention are intended for application directly on to untreated film substrates, our invention does not preclude the prior treatment of the substrate, for example by electron discharge treatment, to promote adhesion of the coating to the film substrate. In addition or alternatively, fillers such as finely divided silica, silicates or calcium carbonate may be incorporated into either or both the film and the applied coating layer to promote adhesion therebetween.

Where the coating composition used in the process of the invention is an aqueous solution or dispersion of a complex aluminium phosphate, a hydrated form of the complex aluminium phosphate is formed and this results in a crystalline material being formed. Optimum results are obtained in the process of this invention when a more glossy form of aluminium phosphate is obtained by excluding water from the system until the conversion to aluminium phosphate has been completed.

The exclusion of water is advantageous in each separate stage in which the complex aluminium phosphate is made or used, extending through from the initial production of the complex to its final conversion into aluminium phosphate by heating, for example in the stages of storage, formulation with solvents, mixing with solids or other components, application of the complex or compositions containing it to substrates and the drying of such coated substrates. It is preferred to exclude water at all these stages as far as is practicable, since the access of water or water vapour at any stage can be detrimental to the eventual form of aluminium phosphate obtained.

The exclusion of water is preferably achieved by carrying out any or all of the stages referred to above under substantially anhydrous conditions. The precise proportion of water which may be tolerated at any given stage will depend upon the particular compositions concerned and the particular properties desired in the final cured product, but can be determined by trial.

The exclusion of water can be achieved in a variety of ways, including:

a. drying of the components used for production of the complex, thus reducing the possibility of any water being part of the complex itself, b. drying the components with which the complex phosphate is mixed, for example solvent, particulate or other solids, and the apparatus used for such mixing;

c. drying the air or atmosphere which comes in contact with the complex or composition containing it, or surfaces to which it has been applied, for example during the stage in which solvent is evaporated from solutions of the complex and during the heating stage;

d. drying any surfaces or articles to which the complex phosphates (or compositions containing them) are applied.

The necessary degree of drying may be achieved by conventional techniques well known in the art.

The exclusion of water may also be achieved by mixing the complex phosphate with a proportion of a compound which reacts preferentially with water. Care should be taken, however, that such a compound does not interfere with the formation of the desired aluminium phosphate or attack the substrate to be coated.

The coated film products of the present invention are of wide applicability. They are suitable for use as electrical insulants, and, in particular, as slot liners for the core members of electric machines such as motors and dynamos to insulate the current-carrying coils of wire wound around a slotted core of magnetic material.

Fabrication of slot liners from a film tape involves a number of shaping, cutting and bending operations which tend to crack the film, thereby impairing the insulating properties of the film. In addition, the slot liners are exposed to solvent attack, which crazes the film, both when the wound core member is impregnated with a solution of a resin filler in a solvent vehicle to prevent "flash-over", and when the finished machine is subsequently treated with cleansing solvents. The metal phosphate coating of this invention affords a degree of protection against cracking and crazing of the film substrate and the coated products are, therefore, particularly suited for use as slot liners.

The coated products of our invention are also suitable for use as tracing and writing media, for example in the form of clear or opaque films having a pencil- or ink-receptive surface. Coatings of aluminium phosphate having a thickness of less than about 3 microns are transparent and films (for example of poly(ethylene terephthalate), so coated are useful as tracing sheets for use in drawing-offices and the like. Particulate material, such as talc, clay, silica, alumina and titania, may, if desired, be incorporated in the coating layer to improve the pencil receptivity of the coated film.

Our coated films also find application as recording materials, for example the coating layer on a narrow film tape may be impregnated with magnetic materials for use in tape-recorders, computers and the like. Alternatively, the coating layer may be filled or impregnated with photosensitive materials for photographic applications, or with photochromic compounds, such as spiropyrans, for use as protective windows, screens and the like, or for recording data for storage in data banks.

If desired, tapes and films including conventional magnetic tapes, photographic films and the like may be overcoated with a layer of aluminium phosphate by the techniques herein described to provide an abrasion-resistant, anti-static, protective coating on the film or tape, and additionally conferring good slip properties on the film or tape. Additionally, the backing of the tape or film may be provided with a coating of aluminium phosphate to provide a protective, anti-static coating having good slip properties.

In addition to exhibiting considerable abrasion-resistance the coated films are also relatively impermeable to contaminants such as oils, greases, fats, water, water vapour and other miscellaneous materials with which the films may come into contact. The films are, therefore, useful as packaging materials, waterproof covers, and decorative materials such as wall coverings and decorative lampshades and are suitable for all other applications for which a washable, soil-resistant substrate is desired.

Application of discontinuous coatings is particularly applicable to packaging films. For example, selected areas of a film package may be provided with an aluminium phosphate coating to improve the receptivity of the coated areas to descriptive or decorative printed matter. Alternatively, tear strips or apertures may be provided in a film package by coating appropriate areas of the package with a layer of aluminium phosphate as hereinbefore defined.

Films coated in accordance with the process of this invention also exhibit improved transparency when the applied phosphate coating is of a thickness less than about 3 microns. This we believe is a result of the filling up of surface irregularities on the film substrate with a glass-like coating which reduces contrast at the film-air interface.

The improvement in the anti-static properties of the polymeric surfaces brought about by provision of a coating of aluminium phosphate is particularly useful in the case of coated film where the film is processed in packaging machinery. The problem of the collection of static electricity on the moving film and consequent adherence of the film to the machine results in processing difficulties such as wrinkling of the film. Processing difficulties are considerably reduced when the film is provided with a thin coating of aluminium phosphate as hereinbefore described. The pick-up of dust and debris from the atmosphere is similarly considerably reduced.

The invention is illustrated by the following examples:

EXAMPLE 1

40 g of anhydrous aluminium chloride was added to 300 ml of laboratory grade ethanol. The resultant solution was cooled to 0° C and 18.6 ml of 88% orthophosphoric acid was added to it in a drop-wise manner and the reaction mixture stirred. The reaction was carried out in an atmosphere of dry nitrogen. The white crystalline material formed was separated from the mixture, washed with ethanol and dried under vacuum at a temperature of 0° C. 70 g of product was obtained of the empirical formula $AlPClH_{25}C_8O_8$.

A sample of the product was dissolved in dry methanol to give a 5% by weight solution. A length of magnetic tape, made from biaxially oriented and heat-set polyethylene terephthalate film coated with an intimate mixture of magnetic iron oxide in a resin binder, which had been stored in a dry environment at a relative humidity of less than 5%, was coated by immersing the tape in the methanolic solution and withdrawing it at a constant speed of 0.2 meters per minute. The methanol was allowed to evaporate off at ambient temperature. The operations of coating and drying the conditioned film were carried out under conditions such that the relative humidity was maintained at less than 5%. When the methanol had evaporated the coated tape was cured in a hot-air oven at 120° C for 30 minutes whilst holding the tape under slight tension to prevent curling of the tape. The coating of aluminium phosphate obtained was free from cracks and blemishes and had a thickness of approximately 0.05 $\mu$m.

The abrasion resistance was assessed by forming the coated tape into a continuous loop and running the tape over a typical recording head until the loop has passed over the head 1000 times. Comparison of the weight loss obtained with that obtained using an uncoated tape showed that the abrasion resistance had been improved.

EXAMPLE 2

A sample of $AlPClH_{25}C_8O_8$ prepared as described in Example 1 was dissolved in dry methanol to give a 2% by weight solution. This solution was used to coat a sample of polyethylene terephthalate film to give a coat weight of approximately 2 mg/dm$^2$ under conditions in which the relative humidity was maintained at less than 20%. The methanol was allowed to evaporate at ambient temperature under these conditions and the coated film was then dried at 120° C for 30 minutes. The surface resistivity of the coating was determined according to British Standard Test 2782 Part 2 Method 203. The surface resistivity of the coating was found to be 2 × 10$^{11}$ ohms/square. The surface resistivity of the uncoated film was measured as 2 × 10$^{15}$ ohms/square.

EXAMPLE 3

A 2% by weight solution of $AlPClH_{25}C_8O_8$ was used to coat a polyethylene terephthalate film having a thickness of approximately 50 $\mu$m under conditions where the relative humidity was maintained at less than 5%. The thickness of the applied coating was approximately 0.05 $\mu$m. The permeability of the coated film to oxygen and carbon dioxide was measured according to the pressure differential method of N. T. Notley which was described in Journal of Applied Chemistry 1963 Volume 13, Page 107. The measurements were made using essentially dry gases at 30° C using a pressure differential of 1 atmosphere. The permeability of the coated film to oxygen was found to be 8.8 cm$^3$/m$^2$/24 hr/atmosphere compared with 45 cm$^3$/m$^2$/24 hr/atmosphere for the uncoated film. The permeability of coated film to carbon dioxide was found to be 33 cm$^3$/m$^2$/24 hr/atmosphere compared with 125 cm$^3$/m$^2$/24 hr/atmosphere for the uncoated film.

EXAMPLE 4

In a further series of experiments the complex aluminium phosphate having the empirical formula $AlPClH_{25}C_8O_8$, described in Example 1, was dissolved in methanol together with a series of additives to give the compositions listed in Table 1. These compositions were used to coat samples of 'Melinex' polyester film using a procedure in which the sample of film was dipped into a beaker of the composition and was then withdrawn at a rate of 23 cm per minute. The dipping process was carried out inside a nitrogen purged box in which the relative humidity was controlled. The relative humidity used for each of the experiments is listed in Table 1.

TABLE 1

| Experiment | Weight of AlPClH$_{25}$C$_8$O$_8$ | Weight of Additive | Weight of methanol | Relative Humidity |
|---|---|---|---|---|
| 1 | 2 g | 0.1 g polyvinylpyrrolidone | 98 g | 30% |
| 2 | 2 g | 0.1 g polyacrylic acid | 98 g | 25% |
| 3 | 10 g | 0.5 g polyvinylpyrrolidone | 90 g | 45% |
| 4 | 10 g | 0.5 g polyacrylic acid | 90 g | 40% |
| 5 | 2 g | 0.06 g 'Lubrol' L* | 98 g | 66% |
| 6 | 2 g | 2 g parachlorometa cresol | 96 g | 58% |

*'Lubrol' L is a commercially available non-ionic surfactant

The samples of 'Melinex' polyester film were found to be completely wetted by each of the coating compositions listed in Table 1 and after drying in the purged box the coated films were placed in an air oven at 120° C for 30 minutes. This process gave continuous strongly adherent coatings of aluminium phosphate on the polyester film substrate. Control experiments in which the additive was omitted were carried out for each of the experiments listed in Table 1. In all cases the composition retracted into discrete droplets as the polyester film was withdrawn from the solution.

EXAMPLE 5

The procedure and coating composition used for experiment 5 of Example 4 was repeated using a sample of 'Melinex' polyester film which had been previously subjected on both sides of the film to a corona discharge treatment. At a relative humidity of 66%, which is a typically ambient relative humidity, a continuous film was deposited on the film and was dried at 120° C for 30 minutes to give a continuous, strongly adherent coating of aluminium phosphate. In a control experiment in which the 'Lubrol' L was omitted and the relative humidity was maintained at 66% the coating composition retracted into discrete droplets when the sample of film was withdrawn from the beaker.

EXAMPLE 6

Using the coating procedure described in Example 4 a sample of polypropylene film which had previously been subjected to a corona discharge treatment was coated with a composition containing 10 g of AlPClH$_{25}$C$_8$O$_8$, 0.2 g of 'Lubrol' L and 90 g of methanol at a relative humidity of 53%. The polypropylene film was completely wetted and was dried and heated to 120° C for 30 minutes to give a continuous coating of aluminium phosphate on the polypropylene film. In a control experiment in which the 'Lubrol' L was omitted the composition retracted into discrete droplets when the sample was withdrawn from the coating solution.

EXAMPLE 7

In a further series of experiments samples of the complex aluminium phosphate, AlPClH$_{25}$C$_8$O$_8$, described in Example 1 were dissolved in methanol and coated on 'Melinex' polyester film at various degrees of relative humidity using the coating procedure described in Example 4. The concentrations of complex aluminium phosphate and methanol, the relative humidities and the quality of the coating obtained are tabulated below.

TABLE 2

| Weight of AlPClH$_{25}$C$_8$O$_8$ (g) | Weight of Methanol (g) | Relative Humidity (%) | Quality of film |
|---|---|---|---|
| 2 | 98 | 5 | Continuous |
| 2 | 98 | 15 | Non-continuous |
| 10 | 90 | 20 | Continuous |
| 10 | 90 | 27 | Non-continuous |
| 20 | 80 | 30 | Continuous |
| 20 | 80 | 45 | Non-continuous |

Samples of film which had continuous coatings were dried in the purged box and then heated to 120° C for 30 minutes. Continuous, strongly adherent films of aluminium phosphate were obtained on the film substrate.

EXAMPLE 8

In a further series of experiments a variety of film substrates, as listed in Table 3, were coated under various conditions of relative humidity. The results obtained are listed in Table 3.

TABLE 3

| Substrate | Coating Composition Weight of AlPClH$_{25}$C$_8$O$_8$ (g) | Weight of Methanol (g) | Relative Humidity % | Quality of Film |
|---|---|---|---|---|
| 'Melinex' polyester film treated by corona discharge | 10 | 90 | 20 | Continuous |
| 'Melinex' polyester film treated by corona discharge | 10 | 90 | 27 | non-continuous |
| Nylon 66 | 2 | 98 | 5 | Continuous |
| Nylon 66 | 2 | 98 | 28 | Non-continuous |
| Nylon 66 | 10 | 90 | 30 | Continuous |
| Nylon 66 | 10 | 90 | 48 | Non-continuous |
| Polypropylene film treated by corona discharge | 20 | 80 | 12 | Continuous |
| Polypropylene film treated by corona discharge | 20 | 80 | 35 | Non-continuous |
| Polyethylene film | 8 | 92 | 5 | Continuous |
| Polyethylene film | 8 | 92 | 30 | Non-continuous |

The samples of film which had continuous coatings were dried in the purged box and then heated to 120° C for 30 minutes. Continuous, strongly adherent film of aluminium phosphate were obtained on the film substrates.

We claim:

1. A glass like coated, organic, plastics film having a coating on at least one surface of said film of aluminium phosphate derived from a solution of a halogen-containing complex phosphate of aluminium containing at least one chemically bound molecule of a hydroxy compound R-OH wherein R is a hydrogen atom or an organic group.

2. A coated film according to claim 1 wherein the hydroxy compound in the halogen-containing complex phosphate of aluminium is ethyl alcohol.

3. A coated film according to claim 1 wherein the halogen-containing complex phosphate of aluminium is a compound having the empirical formula $AlPClH_{25}C_8O_8$.

4. A coated, organic, plastics film according to claim 1 wherein said film is made of a synthetic organic thermoplastic material.

5. A coated, organic, plastics film according to claim 4 wherein said film is made of a polyester.

6. A process for providing an organic, plastics film with a coating of aluminium phosphate comprising applying to at least one surface of the film a coating composition comprising a solution of a halogen-containing complex phosphate of aluminium containing at least one chemically bound molecule of a hydroxy compound R-OH wherein R is a hydrogen atom or an organic group and drying the coating by heating to a temperature of at least 80° C to give a glass-like adherent coating.

7. A process according to claim 6 in which the coating composition comprises a solution of the halogen-containing complex phosphate of aluminium in an organic medium.

* * * * *